(12) United States Patent
Willett

(10) Patent No.: US 6,289,565 B1
(45) Date of Patent: Sep. 18, 2001

(54) SWIVEL SLEEVE FOR HAND HELD TOOL

(75) Inventor: Kevin R. Willett, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/491,036

(22) Filed: Jan. 25, 2000

Related U.S. Application Data

(62) Division of application No. 09/053,463, filed on Apr. 1, 1998, now Pat. No. 6,038,753.

(51) Int. Cl.[7] ................................................. B23P 19/02
(52) U.S. Cl. ........................................... 29/235; 29/243.58
(58) Field of Search ................................. 29/243.5, 235, 29/243.57, 243.58, 453, 451, 525; 81/54, 57.44; 173/169, 170, 68 A; 310/50, 47; 362/204, 205, 206; 200/573–574, 545, 337.2, 341, 324, 318.2, 318.1, 321, 331, 551, 548, 320

(56) References Cited

U.S. PATENT DOCUMENTS

| | | | |
|---|---|---|---|
| 1,122,446 | * | 12/1914 | Wachtel .............................. 362/204 |
| 1,723,371 | * | 8/1929 | Peiper ................................. 200/551 |
| 4,150,330 | * | 4/1979 | Hudson et al. ...................... 362/24 |
| 4,314,124 | * | 2/1982 | Pace .................................... 173/170 |
| 4,708,210 | * | 11/1987 | Rahm .................................. 173/170 |
| 5,575,380 | * | 11/1996 | Imai ..................................... 200/551 |
| 5,692,417 | * | 12/1997 | Irpino ................................. 81/53.12 |
| 5,864,933 | * | 2/1999 | Sheline ............................. 29/243.58 |
| 6,038,753 | * | 3/2000 | Willett ................................... 29/235 |

FOREIGN PATENT DOCUMENTS

| | | |
|---|---|---|
| 0 845 332 A1 | 6/1998 | (EP) . |
| 0 865 952 A1 | 9/1998 | (EP) . |

* cited by examiner

Primary Examiner—Joseph J. Hail, III
Assistant Examiner—Daniel Shanley
(74) Attorney, Agent, or Firm—Brian B. Shaw, Esq.; Stephen B. Salai, Esq.; Harter, Secrest & Emery LLP

(57) ABSTRACT

A tool for installing a seal on a flange in a motor vehicle or the like comprises a generally cylindrical housing; a depressible actuator button extending outwardly from the surface of the housing; a sleeve surrounding the housing in rotatable engagement therewith; and a shoulder within the sleeve for engaging the actuator button when the sleeve is moved longitudinally with respect to the housing.

21 Claims, 2 Drawing Sheets

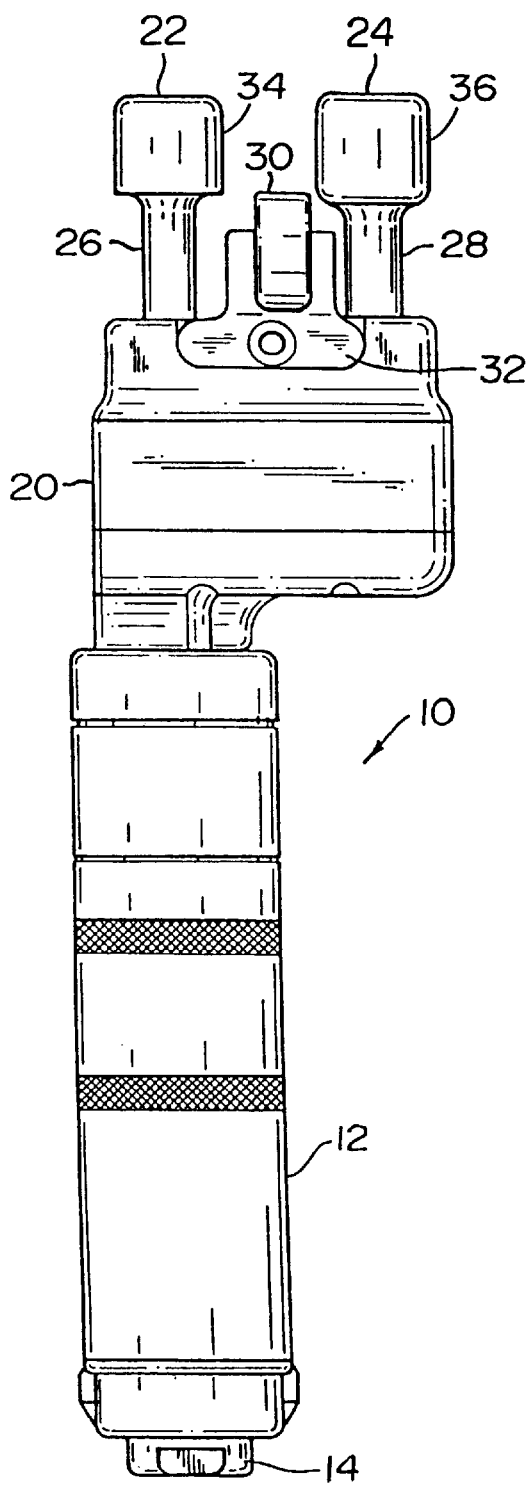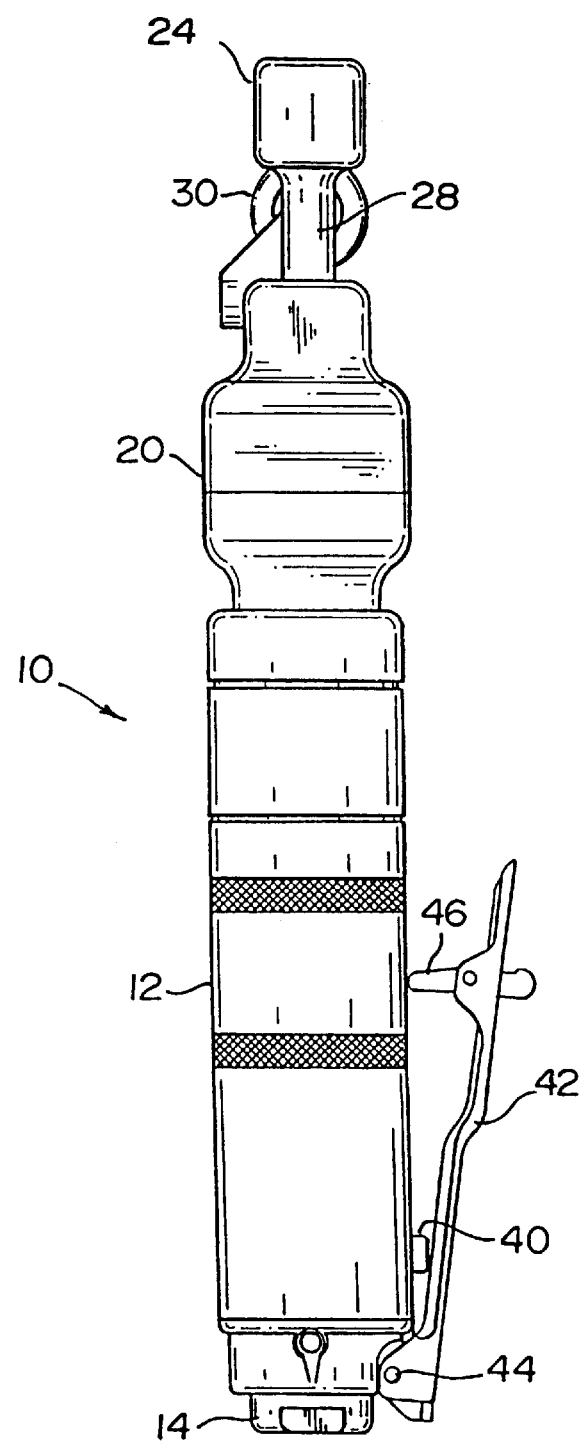
FIG. 1
(PRIOR ART)
FIG. 2
(PRIOR ART)

SWIVEL SLEEVE FOR HAND HELD TOOL

This Application is a Div of Ser. No. 09/053,463 filed Apr. 1, 1998 U.S. Pat. No. 6,038,753.

BACKGROUND OF THE INVENTION

This invention relates generally to tools for installing weatherseals on the flanges of surrounding door and trunk lid openings, for example on motor vehicles, and more particularly to such a tool that is easier for operators to utilize.

The installation of weatherseals on the flanges of door and trunk or similar openings of motor vehicles is commonly accomplished manually or with a pneumatic tool. The tool has opposed spaced apart driven rollers separated by a nip wide enough to accommodate the weatherseal therein. The rollers are preferably counter rotating, and press the weatherseal body therebetween as they travel along the seal to urge it into engagement with the flange. A freely rotating non-powered roller engages the base of the seal to hold the power rollers in alignment with the sides of the seal. The tool has made the installation of seals on flanges easier, and allows an operator to install many more flanges in a given time than he could manually.

The most commonly used tool of the type to which this invention relates comprises a tool head having the driven counter rotating side rollers and freely rotating base roller. The tool head is connected to an air motor most usually enclosed in a cylindrical housing of a size readily gripped with one hand by an operator.

Commonly, the air motor within the housing is actuated by depressing a lever lying alongside the housing that engages a push type button actuator switch on the housing. The lever is ordinarily pivoted at the rear end of the housing, and extends towards the front thereof, with a significant portion extending beyond the first button switch to provide a mechanical advantage.

A tool of the type described can be easily gripped in one hand for operation and the lever can be actuated by the palm or fingers of the hand while holding the tool. A problem arises when the tool is used to install a seal around a door or trunk lid opening that is large and U-shaped, as is quite conventional. If the tool is grasped in the operator's hand in a comfortable position for starting the installation, at one corner of the opening for example, by the time the tool is moved up one edge of the opening for example, by the time the tool is moved up one edge of the opening, across the top, and down the opposite edge, the operator's hand has been contorted into a possibly very uncomfortable position. Since it is normally necessary to grip the tool relatively securely, both to keep the operating lever depressed to maintain power to the tool, and to maintain the tool engaged with the seal to crimp the seal to the flange, the operator quite commonly finishes the installation with the wrist inverted and under considerable strain.

It is an object of this invention to provide a tool for installing a seal on the flange of a door or trunk lid or similar opening of a motor vehicle, without subjecting the operator to the stresses involved in using tools heretofore known.

It is another object of the invention to provide such a tool that is light weight, and comfortable to hold.

It is yet another object of this invention to provide a tool having an actuator mechanism that does not interfere with the comfortable gripping of the tool over a wide range of motion, so as to permit the installation of a seal on a flange of a wide variety of configurations.

It is still another object of this invention to provide a tool of the type described that permits the operator to grip the tool firmly to maintain control, while at the same time permitting the tool to rotate in the operator's hand to avoid the need for contorting the hand to uncomfortable positions.

It is yet another object of this invention to provide a tool of the type described that accommodates a muffler and/or filter for a pneumatically operated tool.

SUMMARY OF THE INVENTION

Briefly stated, and in accordance with a presently preferred embodiment of the invention, a tool for installing a seal on a flange in a motor vehicle or the like comprises a generally cylindrical housing; a depressible actuator extending outwardly from the surface of the housing; a sleeve surrounding the housing in rotatable engagement therewith; and a shoulder within the sleeve for engaging the actuator button when the sleeve is moved longitudinally with respect to the housing.

In accordance with another aspect of the invention, an end cap is attached to the sleeve, and a retainer is attached to the housing for maintaining the sleeve in engagement with the housing.

In accordance with yet another aspect of the invention, the housing includes a flange for engaging a forward portion of the sleeve and limiting the travel thereof with respect to the housing.

In accordance with yet a further embodiment of the invention, the sleeve is fabricated from a light, low friction, easy to machine material such as Delrin plastic.

The novel aspects of the invention are set forth with particularity in the appended claims.

BRIEF DESCRIPTION OF THE DRAWINGS

The invention itself, together with further objects and advantages thereof may be more readily comprehended by reference to the following detailed description of a presently preferred embodiment of the invention taken in conjunction with the accompanying drawings, in which:

FIGS. 1 and 2 are a top view and side view respectively of a seal installation tool in accordance with the prior art;

DETAILED DESCRIPTION OF THE PREFERRED EMBODIMENT OF THE INVENTION

Figure 3:
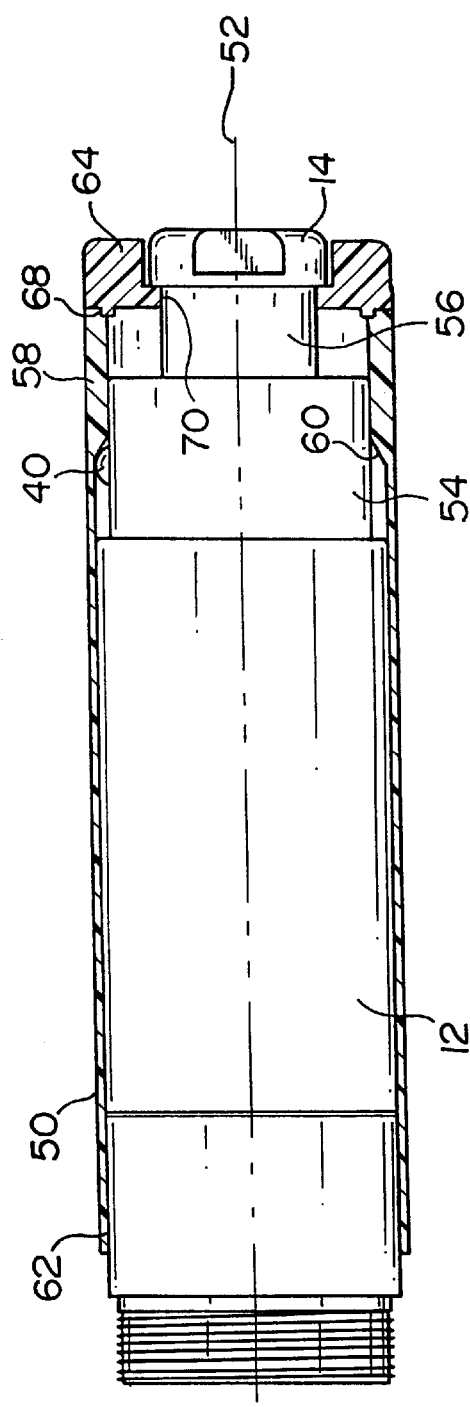
FIG. 3 is a side view, partly in section, of a sleeve in accordance with the invention.

Referring now to FIGS. 1 and 2, a tool for installing a seal on a door or deck flange of a vehicle according to the prior art is illustrated generally at 10. The tool includes a cylindrical body 12 having a diameter of slightly over 1½" for allowing it to be gripped easily in one hand of an operator. The body has a fitting 14 at one end for receiving a mating fitting from a source of pressurized air. The housing encloses a pneumatic motor, not visible, in FIGS. 1 and 2. A gear drive assembly 20 is attached to the distal end of housing 12. First and second drive rollers 22 and 24 are mounted on shafts 26 and 28 that project from the end of gear assembly 20. A non-driven roller 30 is journaled in a bracket 32 attached to the gear assembly 20 between shaft 26 and 28. Confronting surfaces 34 and 36 of rollers 22 and 24 form a nip for receiving the body portion of a weatherseal to be mounted to a flange.

The tool 10 is activated by a depressible button 40, disposed on the proximal end of housing 12. The button is actuated by depressing lever 42 pivotally attached to the end cap that holds fitting 14 by a pin 44. Preferably, a spring loaded safety lock 46 is attached to the distal end of lever arm 42 to prevent the tool from accidentally being activated, by requiring that the safety lock be released before lever 42 can be squeezed to engage push button 40.

The tool 10 can be somewhat awkward to use. Normally, an operator would prefer to activate lever 42 with the fingers of the hand, and this requires holding the tool in a particular orientation to align the lever with the fingers. This orientation may not be optimum for engaging the rollers 22 and 24 with the seal to be installed in all orientations. Some operators have developed a facility for holding the tool lightly, so that the housing 12 can rotate in the operator's hand during use, while maintaining pressure on the lever 42. However, this requires a delicate grip that not all operators can master, and to some extent makes it more difficult to control the tool. If the tool is held in a fixed position in the hand, as the tool is moved from a position where the orientation is relatively comfortable, around the arc of a flange to an opposed position, the operator may find his hand moved to an awkward position that creates unnatural stresses. This limits the speed at which the operator can install weatherseals, and after an extended period of time, may lead to discomfort.

A weatherseal installation tool in accordance with this invention is illustrated in FIG. 3. For simplicity, only the portion of the tool that differs from tool 10 is shown. Like reference numerals refer to similar, or identical elements for ease of understanding.

A cylindrical sleeve 50, preferably formed from a light, durable, low friction material such as Delrin plastic is disposed in slidable low friction engagement with the cylindrical body 12 of the tool. The sleeve 50 is both rotatable about the lengthened axis 52 of the tool and displaceable longitudinally with respect to the cylindrical body 12. The proximal portion 54 of body 12 on which the actuator switch 40 is disposed is of slightly reduced diameter relative to the main body portion 12. An end portion 56 of the motor housing has an even more greatly reduced diameter, and the fitting 14 is threaded thereon.

Figure 5:
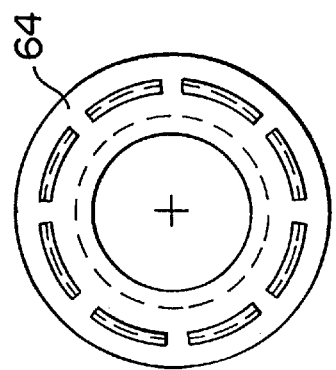
FIGS. 4 and 5 show an enlarged view of the end cap of the sleeve of FIG. 3.
Figure 4:
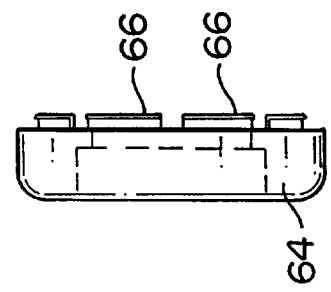

The sleeve 50 has a radially thicker inwardly projecting portion 58 at its proximal end. Portion 58 is connected with the thinner distal portion of the sleeve by a cam shaped shoulder 60. Actuator 40 is preferably contoured so that it is deactivated when it extends into contact with the inner surface of the thin portion of sleeve 50, and actuated when depressed by a forward movement of sleeve 50 to bring camming surface 60 into engagement with the actuator button 40. Shoulder or camming surface 60 allows for a smooth transition from the unactivated condition to the activated condition. Preferably, the sleeve 50 extends towards the distal end of cylinder 12 sufficiently so that the end 62 engages a shoulder on the gear housing 20, while the actuator 40 still partly engages the cam surface 60. This prevents the thickened portion 58 from riding up over the button 40. The proximal end of sleeve 50 is closed by an end cap 64 that has a plurality of radially disposed latching fingers 66, as can be better seen in FIGS. 4 and 5. The inner surface of enlarged portion 58 of sleeve 50 has a groove 68 formed therein for receiving the latching fingers 56. End cap 64 is provided with an inwardly extending annular flange 70 for engaging proximal housing section 56 and pneumatic fitting 14 in low friction sliding and rotating relationship.

The sleeve assembly of FIG. 3 is sized to rotate freely about cylindrical body 12 and slide axially with respect thereto. Delrin plastic provides a particularly advantageous low friction stable interaction with the air motor housing.

In operation, the sleeve 50 can be firmly grasped by an operator without regard to the orientation of the pinch rollers 22 and 24. The air motor is actuated by pushing the sleeve 50 forward with respect to the housing 12, with the tool engaging a seal, so that the cam surface 60 activates the actuator 40 to turn the air motor on. This is easily accomplished, by pressing the non-driven roller 30 against the base of a seal to be installed on a flange, whereupon the driven rolls 22 and 24 move the installation tool along the seal.

If axial pressure on the sleeve is released, the resiliency of actuator button 40 forces the sleeve away from the gear assembly, allowing the actuator 40 to extend to an off position. As long as axial pressure is maintained on sleeve 50, the motor remains energized, and the housing 12 is free to rotate within the sleeve to allow the rollers 22, 24 and 30 to follow the contour of a flange on which a seal is being installed, without the need for the operator to contort his hand into an uncomfortable orientation. Relieving axial pressure on the sleeve deactivates the air motor as required.

While the invention has been described in connection with a presently preferred embodiment thereof, those skilled in the art will recognize that certain modifications and changes may be made therein without departing from the true spirit and scope of the invention, which accordingly is intended to be defined solely by the appended claims.

What is claimed is:

1. A tool assembly comprising:
    (a) a cylindrical housing;
    (b) a sleeve, encircling a portion of the housing, the sleeve rotatable with respect to the housing and longitudinally moveable with respect to the housing; and
    (c) an actuator connected to the housing, the actuator movable between an on position and an off position;
    (d) the sleeve moving the actuator to the on position when the sleeve is rotated, or moved longitudinally or both.

2. The tool assembly of claim 1, further comprising a retaining flange sized to limit longitudinal displacement of the sleeve relative to the housing.

3. The tool assembly of claim 2, wherein the retaining flange is connected to the sleeve.

4. The tool assembly of claim 2, wherein the retaining flange is connected to the housing.

5. A tool assembly for a tool having a cylindrical housing, comprising:
    (a) a cylindrical main portion located about the housing and having a first radial thickness and a first inner diameter;
    (b) a cylindrical second portion connected to the main portion and located about the housing, the second portion having a second radial thickness and a second inner diameter; and
    (c) a camming surface intermediate the first inner diameter and the second inner diameter.

6. The tool assembly of claim 5, further comprising an inwardly projecting retaining flange connected to the main portion or the second portion.

7. The tool assembly of claim 5, wherein the first inner diameter is greater than the second inner diameter.

8. The tool assembly of claim 5, wherein the first inner diameter is less than the second inner diameter.

9. The tool assembly of claim 5, wherein the main portion has a first outer diameter and the second portion has a different second outer diameter.

10. The tool assembly of claim 5, wherein the main portion has a first outer diameter and the second portion has an equal second outer diameter.

11. The tool assembly of claim 5, wherein the main portion and the second portion are integral.

12. The tool assembly of claim 5, wherein the main portion and the second portion are connected to the housing for rotatable and longitudinal displacement relative to the housing.

13. A tool assembly comprising:
 (a) a cylindrial housing;
 (b) an actuator connected to the housing;
 (c) a sleeve encircling the housing and having an inner surface sized to slideably receive the housing, the inner surface including a camming surface, the sleeve rotatably connected to the housing and longitudinally moveable relative to the housing between an actuating position and a non-actuating position, the camming surface located to contact the actuator upon movement of the sleeve to the actuating position.

14. The tool assembly of claim 13, wherein the sleeve includes a constant outer diameter.

15. The tool assembly of claim 13, wherein the sleeve has a varying outer diameter.

16. The tool assembly of claim 13, wherein the sleeve can be moved longitudinally between the actuating position and the non-actuating position independent of the rotational position of the sleeve relative to the housing.

17. A tool assembly comprising:
 (a) a cylindrial housing;
 (b) an actuator connected to the housing;
 (c) a sleeve encircling the housing and having an inner surface sized to slideably receive the housing, the inner surface including a camming surface, the sleeve rotatably connected to the housing and longitudinally moveable relative to the housing between an actuating position and a non-actuating position, and freely rotatable relative to the housing, the camming surface located to contact the actuator upon movement of the sleeve to the actuating position.

18. A tool assembly comprising:
 (a) a tool housing;
 (b) a switch connected to the housing; and
 (c) a sleeve encircling the housing and rotatably coupled to the housing, the sleeve being longitudinally moveable relative to the housing between an activating position and a non-activating position.

19. The tool assembly of claim 18, further comprising a retaining flange on the housing or the sleeve.

20. The tool assembly of claim 18, wherein the sleeve includes an inner surface having a camming surface located to contact the switch.

21. The tool assembly of claim 18, wherein the sleeve has an outer surface, the outer surface being contoured or cylindrical.

* * * * *